United States Patent Office 2,755,629
Patented July 24, 1956

2,755,629

HYDRAULIC BRAKE CONSTRUCTION

Carl F. Baisch, Allen Park, Mich., assignor to Ford Motor Company, Dearborn, Mich., a corporation of Delaware Application August 12, 1953, Serial No. 373,824

1 Claim. (Cl. 60—54.6)

This invention relates generally to hydraulic brake constructions for motor vehicles, and has particular reference to a combined master cylinder and reservoir construction.

In the past it has been customary to mount the master cylinder of a vehicle hydraulic brake system upon the vehicle frame in an obscure location. More recently, master cylinders of certain vehicles have been mounted upon the dash panel dividing the engine and passenger compartments, with the piston rod projecting through the dash for manual actuation by a foot pedal in the passenger compartment. This places the master cylinder on the engine compartment side of the dash panel in a relatively high location, protected from road dirt and particles which might be thrown up by the vehicle wheels, and also in a readily visible position when the hood is raised. The construction of the present invention is particularly designed for a master cylinder to be located in this position, and comprises an integral horizontally extending master cylinder and a vertically extending cylinder projecting upwardly from the upper wall of the horizontal cylinder and internally threaded to receive a plastic cylinder forming a vertical extension thereof. The vertical cylinder and the plastic cylinder provide a reservoir for hydraulic fluid used to replenish fluid lost in the system, and by reason of the semi-transparency of the plastic cylinder and the location of the unit in the engine compartment high on the dash panel, the level of fluid in the reservoir can be readily ascertained by visual inspection. Periodic checks will thus enable the owner to tell when it is necessary to replenish the fluid. Another feature of the construction is the integral upwardly extending cylinder which forms the lower portion of the fluid reservoir and which provides a safe quantity of fluid for emergency use in the event of breakage or leakage in the plastic portion of the reservoir. In addition, the juncture between the vertical cylinder, which is of metal, and the semitransparent plastic cylinder, provides a reference point indicating a safe fluid level so that the owner may at a glance tell whether or not replenishment is necessary.

Other objects and advantages of this invention will be made more apparent as this description proceeds, particularly when considered in connection with the accompanying drawings, wherein.

Figure 1:
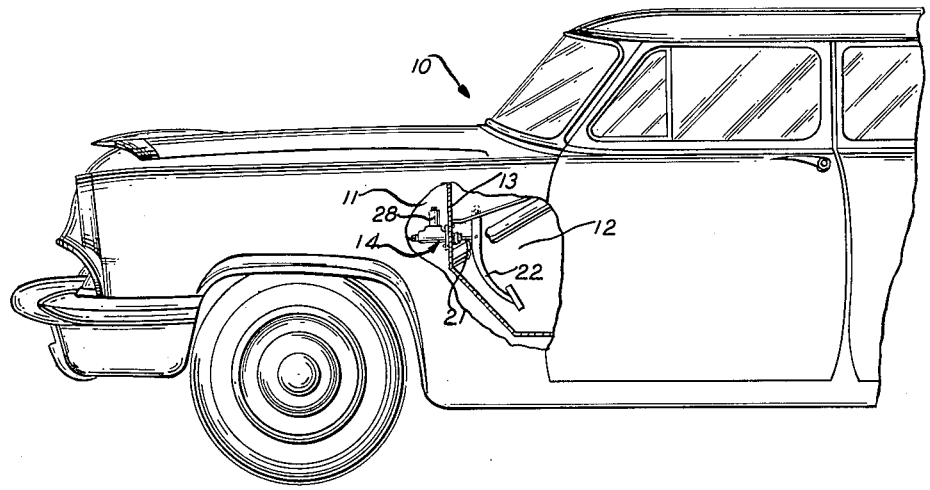
Figure 1 is a side elevation of the forward portion of the motor vehicle, partly broken away, and incorporating the hydraulic brake construction of the present invention.

Referring now to the drawings, and particularly to Figure 1, there is shown a vehicle 10 having an engine compartment 11 and a passenger compartment 12 separated by a generally vertically extending dash panel 13.

A master cylinder and reservoir unit, indicated generally by the reference character 14, is mounted upon the dash panel 13 on the engine compartment side of the latter.

The unit comprises a cast horizontally disposed elongated master cylinder 16 provided with an integral vertical flange 17 near its forward end. The flange 17 is provided with apertures to permit the unit to be secured to the dash panel by means of bolts 18.

A piston 19 is mounted in the master cylinder 16 for reciprocation therein. The piston 19 is interconnected by means of a connecting rod 21 to a foot pedal 22 for actuation by the driver of the vehicle. It will be noted that the forward portion of the master cylinder and the connecting rod 21 extend through the dash panel 13 into the passenger compartment 12 of the vehicle for direct attachment to the pedal 22, which is here shown as of the depending type.

Figure 2:
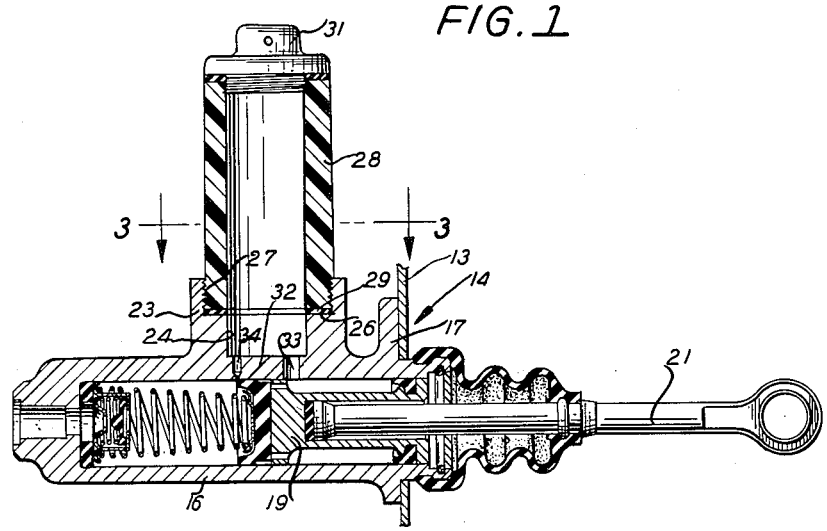
Figure 2 is an enlarged longitudinal cross sectional view through the master cylinder and reservoir of the construction shown in Figure 1.
Figure 3:
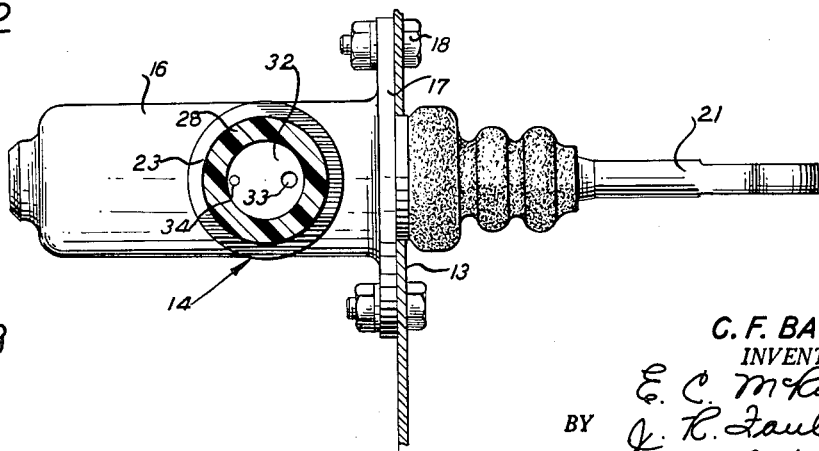
Figure 3 is a horizontal cross sectional view taken on the plane indicated by the line 3—3 of Figure 1.

Generally centrally of the horizontal master cylinder 16, the latter is formed on its upper wall with a vertically extending cylinder 23. The vertical cylinder 23 is integrally cast with the horizontal cylinder 16. As best seen in Figure 2, the vertical cylinder 23 is formed with an internal bore 24, an annular shoulder 26, and an internally threaded portion 27 adjacent its upper end.

Forming a vertical extension of the vertical cylinder 23 is a semitransparent plastic cylinder 28. The cylinder 28 is externally threaded adjacent its lower end so as to engage the internally threaded portion 27 of the boss to rigidly mount the plastic cylinder in a vertical position. A resilient annular sealing ring 29 is seated upon the shoulder 26 of the vertical cylinder 23 and is engaged by the lower end of the plastic cylinder 28 to form a fluid tight seal between the two vertical cylinders.

At its upper end the plastic cylinder 28 is internally threaded to receive a filler plug 31 which may be readily removed to permit fluid to be introduced into the cylinder 28 and which also is provided with conventional venting means.

The upper wall 32 of the master cylinder 16 separates the master cylinder 16 from the reservoir 28, and is provided with a pair of ports 33 and 34 therethrough, establishing communication between the fluid reservoir and the interior of the master cylinder 16. The port 33 communicates with the master cylinder rearwardly of the head of the piston 19 while the port 34 communicates with the master cylinder forwardly of the piston in its retracted position, as in conventional practice.

From the foregoing it will be seen that the plastic cylinder 28 forms a vertical extension of the vertical cylinder 23 and that together they form a fluid reservoir to store hydraulic brake fluid to replenish fluid lost in the brake system. Since the plastic cylinder 28 is semitransparent, and is located in a high position in the engine compartment on the dash panel, it is possible for the operator to tell at a glance the amount of fluid in the reservoir simply by opening the vehicle hood. It is thus a simple matter to keep a check upon the hydraulic brake fluid supply and to replenish it when necessary.

The vertical cylinder 23 is a safety feature since it will retain a certain amount of hydraulic brake fluid in the event breakage or leakage in the plastic cylinder 28 causes the loss of fluid in the upper portion of the reservoir. In addition, the juncture between the metal cylindrical boss 23 and the plastic cylinder 28 forms a reference point indicating the safe level of fluid in the reservoir, so that the operator will be able to readily ascertain whether or not fluid addition is required. If the fluid level cannot be seen through the transparent cylinder 28 then replenishment would be in order.

The term "plastic" as used in the specification and claims of this application is meant to cover glass and other transparent or semitransparent materials.

It will be understood that the invention is not to be limited to the exact construction shown and described, but that various changes and modifications may be made without departing from the spirit and scope of the invention, as defined in the appended claim.

What is claimed is:

A hydraulic master cylinder adapted to be mounted upon the vertical dash panel of a motor vehicle, comprising a horizontally disposed cast metal cylinder having an end flange connected to said panel, a piston reciprocable in said horizontal cylinder and having a head, a pair of vertical passageways through the upper wall of said horizontal cylinder immediately adjacent the front and rear edges of the head of said piston in its retracted position, a vertically disposed cast metal cylinder formed integrally with said horizontal cylinder and extending upwardly from the upper wall thereof and enclosing said ports, the walls of said vertical cylinder being relatively thick and having a stepped portion adjacent its upper end forming an internal shoulder spaced above the upper wall of the horizontal cylinder, the thinner walled portion of said vertical cylinder above said shoulder being internally threaded, a resilient sealing ring seated on said shoulder, a semitransparent plastic cylinder having its lower end externally threaded for engagement with the internally threaded thin walled upper portion of said cast metal cylinder, said plastic cylinder forming an extension of said vertical cylinder to form therewith a fluid reservoir, the length of said vertical cast metal cylinder being substantially 30% of the overall length of said fluid reservoir and the upper edge of said vertical cast metal cylinder representing the safe minimum level of fluid in the reservoir to provide an emergency supply in the event of breakage or leakage in said plastic cylinder and also to provide a transparent reservoir to permit recognition of the proper time to replenish the fluid supply in said reservoir.

References Cited in the file of this patent
UNITED STATES PATENTS

| | | |
|---|---|---|
| 1,043,680 | Dowell | Nov. 5, 1912 |
| 1,333,839 | Daniels | Mar. 16, 1920 |
| 1,533,093 | Booth | Apr. 14, 1925 |
| 2,124,762 | Carroll | July 26, 1938 |
| 2,638,748 | Miller | May 19, 1953 |